United States Patent [19]
Brandau et al.

[11] Patent Number: 5,238,389
[45] Date of Patent: Aug. 24, 1993

[54] APPARATUS FOR PREPARING A HOLLOW PLASTIC ARTICLE

[75] Inventors: Ottmar Brandau, Erin; Tai C. Fok, Mississauga; Robert D. Schad, Toronto; Richard M. Unterlander, Holland Landing, all of Canada

[73] Assignee: Husky Injection Molding Systems Ltd., Bolton, Canada

[21] Appl. No.: 935,632

[22] Filed: Aug. 24, 1992

Related U.S. Application Data

[63] Continuation-in-part of Ser. No. 709,172, Jun. 3, 1991, abandoned.

[51] Int. Cl.⁵ .............................. B29C 49/62
[52] U.S. Cl. ................... 425/522; 425/451.6; 425/541; 425/812
[58] Field of Search ........... 425/522, 541, 812, 534, 425/451.6; 264/526; 65/261-263; 164/410, 234; 249/141

[56] References Cited

U.S. PATENT DOCUMENTS

| | | | |
|---|---|---|---|
| 3,078,508 | 2/1963 | Martin, Jr. | 425/812 X |
| 4,120,636 | 10/1978 | Appel et al. | 425/541 |
| 4,140,468 | 2/1979 | Duga | 425/534 |
| 4,350,443 | 11/1982 | Michaels | 249/141 X |
| 4,421,472 | 12/1983 | Martin, Jr. | 425/541 X |
| 4,648,831 | 3/1987 | Johnson | 425/541 X |
| 4,690,633 | 9/1987 | Schad et al. | 425/534 X |

FOREIGN PATENT DOCUMENTS 42-665 1/1967 Japan ..................... 264/526

*Primary Examiner*—Richard L. Chiesa
*Attorney, Agent, or Firm*—Bachman & LaPointe

[57] ABSTRACT

The present invention discloses a blow mold for forming a hollow plastic article from a parison including at least two relatively reciprocable mold portions which form a mold cavity therebetween having a shape of the desired hollow plastic article, and a toggle mechanism for relatively moving the mold portions from a first open position to a second position wherein the mold portions are in contacting relationship to a third position wherein the mold portions are spaced apart to form a controlled vent therebetween.

8 Claims, 3 Drawing Sheets

APPARATUS FOR PREPARING A HOLLOW PLASTIC ARTICLE

This application is a continuation-in-part of U.S. patent application Ser. No. 709,172, filed on Jun. 3, 1991, now abandoned.

BACKGROUND OF THE INVENTION

Plastic parisons or preforms are conventionally reheated and formed into hollow plastic articles by blow molding in a blow mold using high pressure fluid, with if desired using a stretch rod for stretch blow molding.

The preforms are preheated in ovens immediately prior to being transferred into a blow mold. Stretch rods may be incorporated with the blow mold and typically enter the preforms from its open end and extend during the blow stage to cause biaxial orientation of the blown article.

A two stage reheat blowing machine of the type described in U.S. Pat. Nos. 4,793,960, 4,690,633 and 4,522,581 uses a series of pallets to carry preforms through a series of processing stages: thermal conditioning, stretch-blow molding and strip-off or ejection. At the stretch-blow molding station it is important that the preform is accurately aligned with the blow mold to insure that the finished blown article is symmetrically formed with respect to the neck finish.

The present invention deals with an apparatus for venting the blow mold during the foregoing procedure In most kinds of mold and casting processes a provision is made in the mold to allow air or gases to vent from the mold cavity so that the molding material can completely fill the cavity and form a part that is free from voids. Injection molding of plastic requires the venting to permit the escape of air while preventing the escape of the incoming plastic, which is being injected at high pressure, typically 20,000 psi. Vents in injection molds are therefore typically 0.001–0.003" wide. However, most plastic parts are made with constant wall thicknesses in the range of 0.020–080" and even for parts with large surface areas the volume of air in the mold to be vented is comparatively small.

The process of blow molding, including stretch blow molding, uses a preheated preform, or parison, which is enlarged rapidly by the admission of high pressure fluid, usually air at 700–1000 psi, to the interior of the preform to inflate it until it is pressed against the interior walls of a closed blow mold cavity. Consequently, the comparatively large volume of air trapped inside the closed blow mold cavity before the preform is inflated must escape, or be vented, as rapidly as the preform is inflated. Typically the blowing portion of the cycle is less than 1 second. In the case of a 2 liter beverage bottle the volume of air to be vented is slightly less than 2 liters. Although blow mold vents, typically in the parting surface of the mold, can be wider than injection molding vents, they are limited to 0.010" because wider vents cause a witness line to be formed on the outer surface of the article.

It is conventional to clamp mold halves together and to cut vents into the mold's parting surfaces. Thus the clamping force is distributed over that area of parting surface that remains after vents have been cut. If this area is too small the mold halves will be deformed or "hobbed", a form of cold working, until the vents are eliminated and their area once again added to help support the clamp force. Meanwhile the elimination of the vents has made the mold useless.

U.S. Pat. No. 3,078,508 shows a blow mold made from porous material and provided with a vacuum-blow air pump. The air in the closed mold is evacuated before the preform is inflated to speed up the cycle and improve the part quality. However, a porous mold structure is inherently weak and the system is costly since a vacuum-blow pump and ancillary controls must be provided. U.S. Pat. No. 4,489,771 shows a venting device which provides a large opening to vent a large amount of gas while providing a means to automatically close the vent when the injected resin reaches it. The complicated device only operates at very local places on the parting line, and would not function if used in a blow mold, wherein there is no easily flowing resin to close the valve. U.S. Pat. No. 4,421,472 shows a blow clamp operated by a linkage mechanism such that both platens move symmetrically about the centerline of an extruded parison. This arrangement is actuated by a cylinder, which must resist all the force generated by the blowing action and does not have a self locking feature normally associated with toggle actuated clamps. U.S. Pat. No. 4,120,636 to Appel shows another blow clamp operated by a linkage mechanism keeping the platens symmetrical about the centerline of the preform. U.S. Pat. No. 4,140,468 to Duga shows a toggle mechanism for symmetrically moving and clamping the platens of a blow clamp symmetrically about the centerline of the preform.

It is therefore a principal objective of the present invention to provide an apparatus whereby air trapped in a blow mold cavity is conveniently and expeditiously released without adverse effects on the blow molded product.

SUMMARY OF THE INVENTION

In accordance with the present invention, it has now been found that the foregoing objects and others can be readily achieved.

The apparatus of the present invention comprises: a blow mold for forming a hollow plastic article from a parison including at least two relatively reciprocable mold portions which form a mold cavity therebetween having a shape of a desired hollow plastic article; means for holding the parison within the blow mold; means for relatively moving said mold portions from an open position to a position wherein the mold portions are spaced apart to form a controlled vent therebetween; means for maintaining the mold portions in said controlled vent position; and means for introducing high pressure fluid into the parison to expand same into conformity with the mold cavity; whereby air trapped in the mold cavity is released via said controlled vent.

The apparatus of the present invention comprises: a blow mold for forming a hollow plastic article from a parison including at least two relatively reciprocable mold portions which form a mold cavity therebetween having a shape of a desired hollow plastic article; means for holding the parison within the blow mold; means for relatively moving said mold portions from a first open position to a second position wherein the mold portions are in contacting relationship to a third position wherein the mold portions are spaced apart to form a controlled vent therebetween; and means for introducing high pressure fluid into the parison to expand same into conformity with the mold cavity; whereby air trapped in the mold cavity is released via said controlled vent.

Preferably, both mold portions are movable and preferably the mold portions are spaced apart to form a controlled vent to the mold cavity from 0.005" to 0.010" wide.

In a particularly preferred embodiment, the means for relatively moving the mold portions comprise a toggle mechanism including a rotatable crankshaft and a linkage means connecting the crankshaft to at least one mold portion including means for rotatably mounting the crankshaft on the linkage means in an eccentric manner, whereby the crankshaft rotates from a first crankshaft position corresponding to said first position, to a second crankshaft position corresponding to said second position to a third crankshaft position corresponding to said third position wherein said third crankshaft position is an overstroked position.

A first movable platen is generally connected to one mold portion and a second movable platen connected to a second mold portion wherein the means for relatively moving the mold portions moves the platens in synchronism. It is desirable to provide a toggle mechanism as described above for each platen, with each toggle mechanism including a rotatable crankshaft and a linkage means connecting each crankshaft to its respective platen and a timing belt interconnecting the crankshafts. A stop means is provided to hold the crankshaft in the overstroked position.

Further features and advantages of the present invention will appear hereinbelow.

BRIEF DESCRIPTION OF THE DRAWINGS

The present invention will be more readily understandable from a consideration of the accompanying drawings, wherein.

DETAILED DESCRIPTION OF THE PREFERRED EMBODIMENTS

Figure 1:
FIG. 1 is a block diagram showing the stations through which the parisons pass.

Referring to the drawings, FIG. 1 shows in a block diagram the preferred cycle from injection station where the parisons or preforms are prepared, to receiving station where they are transferred to holding means including mandrels, preferably by a robot, to a temperature conditioning station where the temperature is adjusted so as to be suitable for blowing and biaxial orientation, to the blowing station, and finally to the blown article removal station. The cycle is shown in U.S. Pat. No. 4,690,633. The particular features of the overall cycle are not critical to the present invention. Thus, one can readily use an apparatus as shown and described in U.S. Pat. No. 4,690,633. The parisons may or may not be prepared in-line with the other operations and may readily be made at a different time. The transfer path may take the form of an oval path, a straight path, or a horse-shoe shaped path, or any convenient configuration.

The apparatus of the present invention is directed to the blow molding station and particularly to an apparatus for releasing the air trapped in the mold cavity upon expansion of the parison therein.

Figure 2:
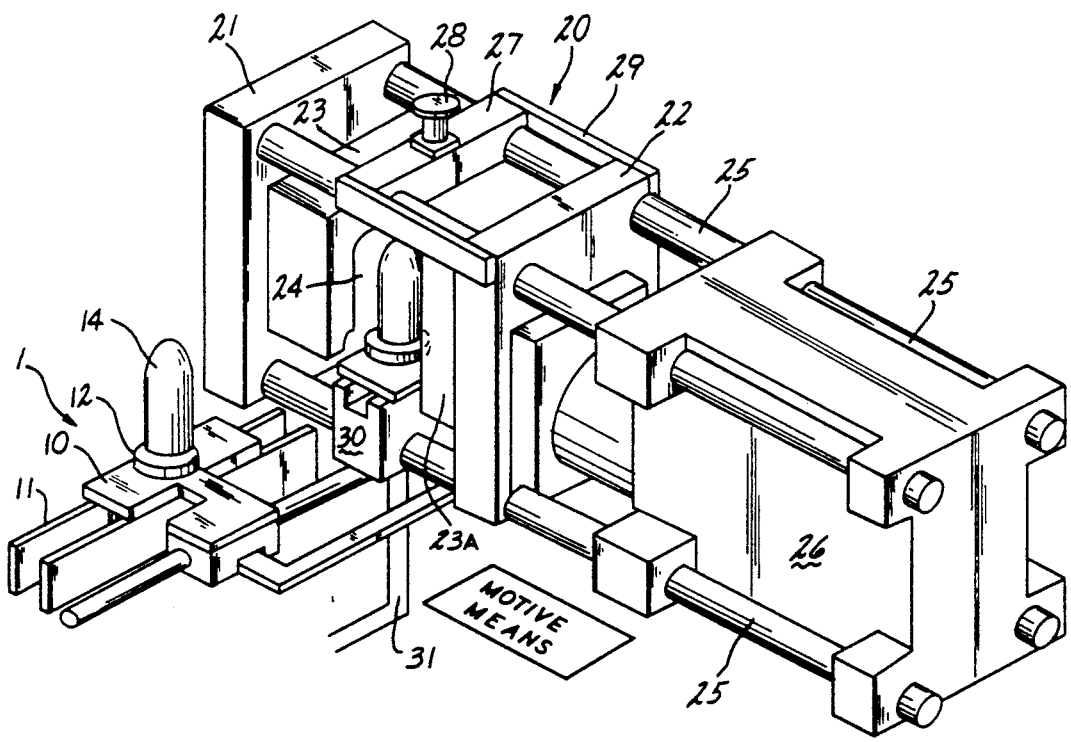
FIG. 2 is an isometric view of the blow molding station.

FIG. 2 is an isometric schematic view of the blow molding station including the holding means with parison thereon aligned and ready to be received by the blow mold. FIG. 2 shows a single holding means carrying a single parison; however, it should be understood that the present invention may readily be used when the holding means carries a plurality of parisons or when a plurality of mandrels carry a plurality of parisons. For convenience, in the following discussion, the present invention has been described with a single holding means carrying a single parison.

Referring to FIG. 2, holding means 1 includes pallets 10 retained in channel track 11 having been transferred thereto from the conditioning station by means not shown. Pallets 10 hold rotatable mandrels 12 which in turn hold parisons or preforms 14. The particular parison shape is representative only and any suitable shape can be used. The parison and mandrel arrives at the blow station after traversing a conditioning station on a rotating mandrel as described in the aforesaid U.S. Pat. No. 4,690,633.

Blow mold 20 includes fixed first platen 21 and movable second platen 22, fixed first mold portion 23 and movable second mold portion 23A forming therebetween a mold cavity 24 in the shape of the hollow article to be formed. Movable platen 22 moves on tie rods 25 activated by motor 26 and means which will be described below. Base mold 27 is positioned above mold 24 to form the article bottom with piston 28 connected thereto for moving the bottom mold into appropriate alignment for formation of the desired base for the article and motive means (not shown) connected thereto for activating said piston. Preferably both platens and mold portions are movable as will be described below, but the present invention also contemplates one being fixed as shown in FIG. 2. Linkage means 29 are provided connected to the movable platen 22 and bottom mold 27 in order to maintain the desired positioning thereof. For clarity only the top linkage means are shown in FIG. 2. Channel track 30 sits spaced from but closely adjacent to channel track 11 so that pallets 10 can readily move into position in the blow mold. The holding means may include a depending leg or spindle or other means which may be engaged by a chain link or any other desired motive means for moving the pallet. Means 31 are also provided for introducing high pressure fluid from a fluid source (not shown) into the parison in the mold cavity to expand the parison into conformity with the mold cavity. As indicated above, if desired, a stretch rod may also be provided for introduction into the parison as is known in the art to provide a stretch blow molded article.

The present invention utilizes a toggle mechanism for relatively moving the mold portions and advantageously utilizes the action of overstroking a toggle mechanism.

The action of overstroking a toggle clamping mechanism moves the center pin of a two link toggle beyond its center position, where the two links are in line to a position slightly beyond. In this overstroked position, the linkage is mechanically locked and can resist large forces. A toggle is therefore an efficient means to hold two mold halves together in that with comparatively little actuated forces, it is possible to generate a large clamping force. One of the disadvantages is that to reach the overstroked position, the links and pins are subjected to considerable force as they, the tiebars, platens and mold halves, are all deflected so that when in the overstroke position, the mold parting faces are still closed. If the mechanism was designed so that the mold parting faces just met when the toggle links were in line (not overstroked), then the mechanism would not effectively clamp when locked, since overstroking would now cause the mold parting faces to separate slightly. Thus, it is more effective to design the mechanism so that the mold parting faces are together when the linkage is overstroked and the components are made substantial enough to resist the forces generated when moving the linkage through the aligned, center position.

However, in accordance with the present invention, the overstroked position is effectively employed to form a controlled vent in the mold cavity.

Figure 3:
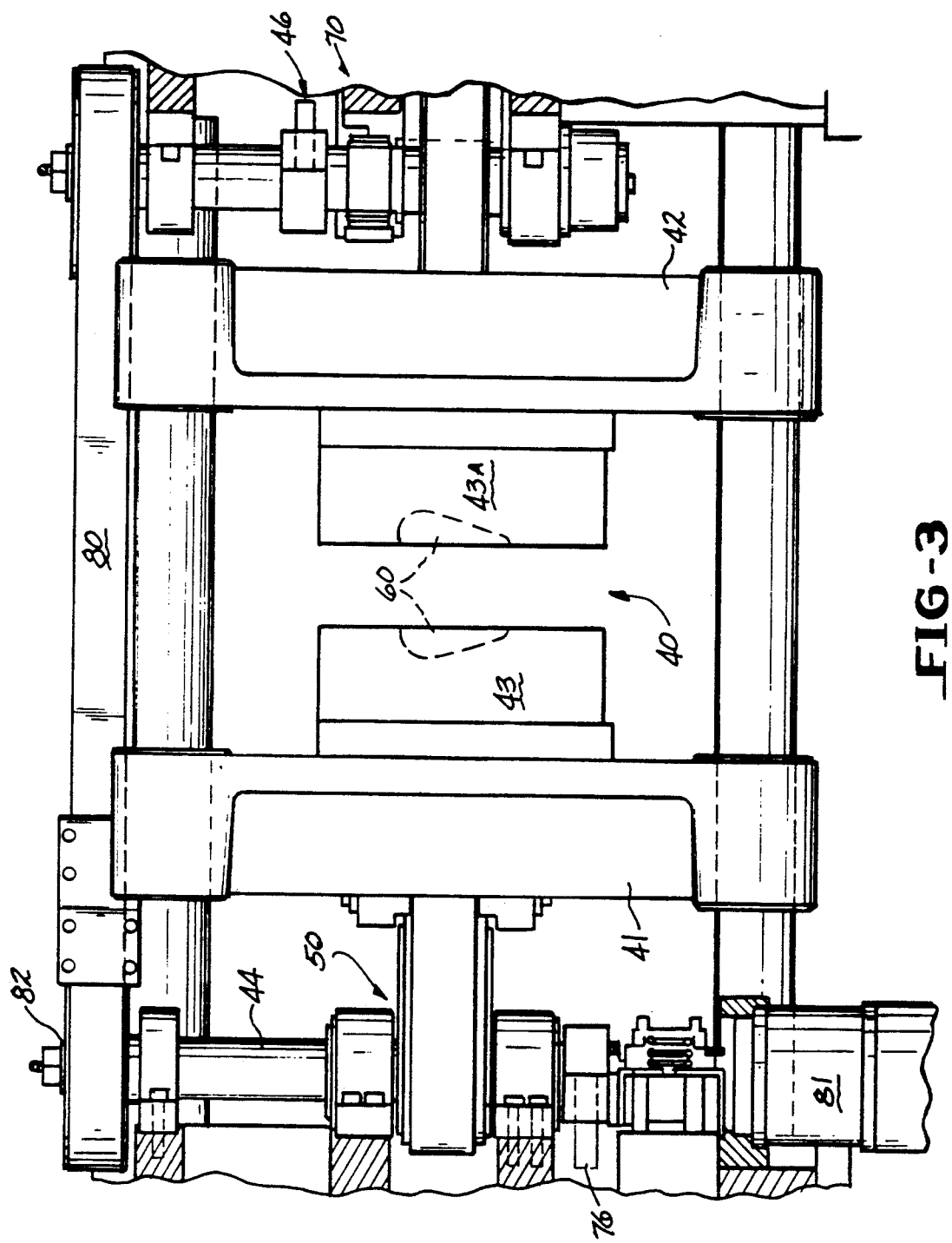
FIG. 3 shows a partial sectional view of the apparatus of the present invention.

Referring to FIGS. 3–7, FIG. 3 is a partial sectional view of the apparatus and FIGS. 4–7 are schematic views of the clamp mechanism of FIG. 3 in various positions. In FIG. 3, blow mold 40 includes movable first platen 41 and movable second platen 42, movable first mold portion 43 affixed to the first platen and movable second mold portion 43A affixed to the second platen forming a mold cavity 60 therebetween shown in phantom in FIG. 3, and as in FIG. 2 in the shape of the hollow article to be formed. Thus, the apparatus of FIG. 3 is basically the apparatus of FIG. 2 with both platens and mold portions movable. Each platen is moved by its own three pin toggle mechanism, toggle mechanism 50 for platen 41 and toggle mechanism 70 for platen 42 which are in turn operated by a common timing belt 80 and servo drive 81.

Thus, moving platen 41 is connected to rotatable crankshaft 44 via linkage means 45 (see FIGS. 4–7) with the crankshaft being driven by any appropriate drive means as servo electric drive means 81. As shown in FIGS. 4–7, the crankshaft 44 is rotatably mounted on linkage means 45 in an eccentric manner and rotates in the direction of arrow A. Cam 46 is mounted on crankshaft 44 and stop 47 (see FIGS. 6–7) is mounted on machine frame 48 in a fixed position. Toggle mechanism 70 for mold platen 42 operates in the same manner as toggle mechanism 50 so that crankshaft 74 is connected to platen 42 via linkage means 75 and crankshaft 74 is rotatably mounted on linkage means 75 rotating in the direction of arrow B. Drive belt 80 movable on pulley 82 is connected to both crankshafts so that turning one crankshaft turns both in sequence and operates both identical clamp mechanisms to move the platens symmetrically.

Figure 4:
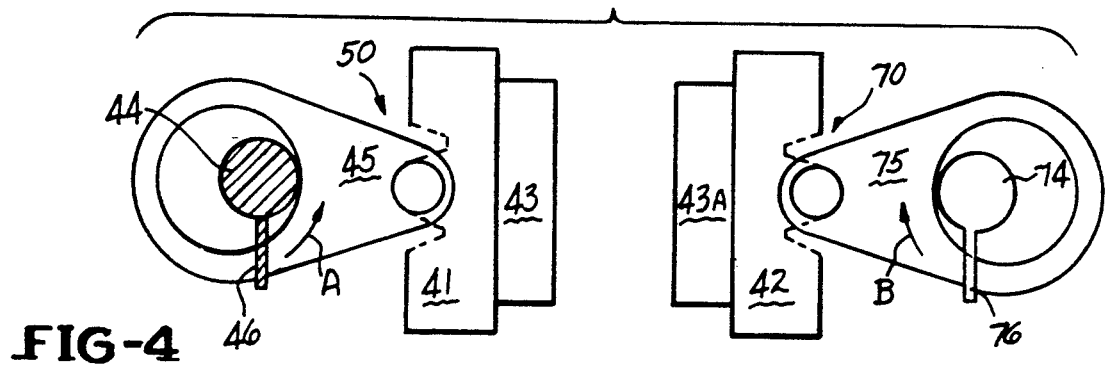
FIGS. 4–7 are schematic representations of the clamp mechanism in various positions.
Figure 5:
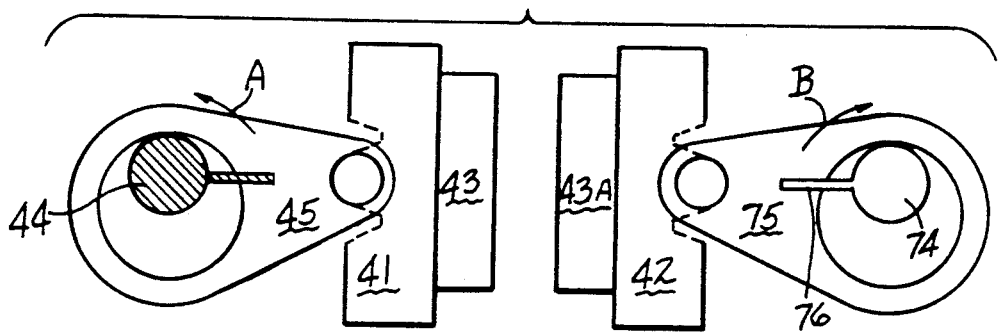

FIG. 4 shows the mold platens in a first open position. FIG. 5 shows the mold platens in a partially closed position with the crankshafts being turned in the direction of arrows A and B, respectively. In FIG. 5 movable platens 41 and 42 and their respective mold portions 43 and 43A have moved closer together.

Figure 6:
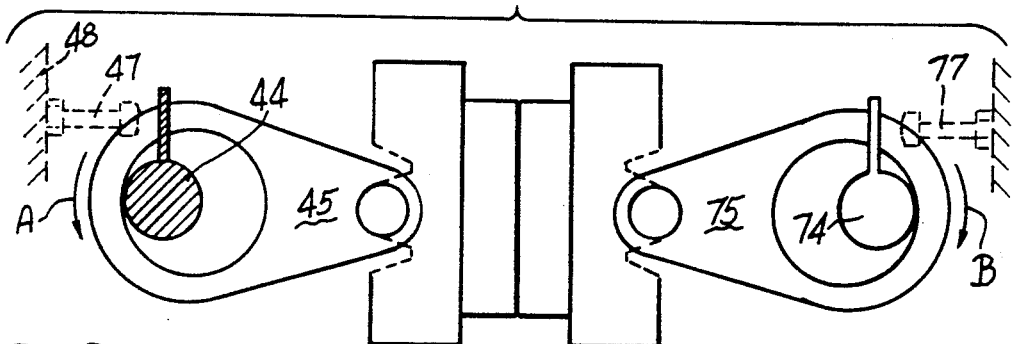

FIG. 6 shows the mold platens in their second position with the mold portions 43 and 43A in contacting relationship to form a sealed mold cavity therebetween, as mold cavity 24 in FIG. 2. This is the fully extended or mold closed position formed by the crankshafts being further turned in the direction of arrows A and B wherein the tiebars are stretched and the mold is under full clamp tonnage.

Figure 7:
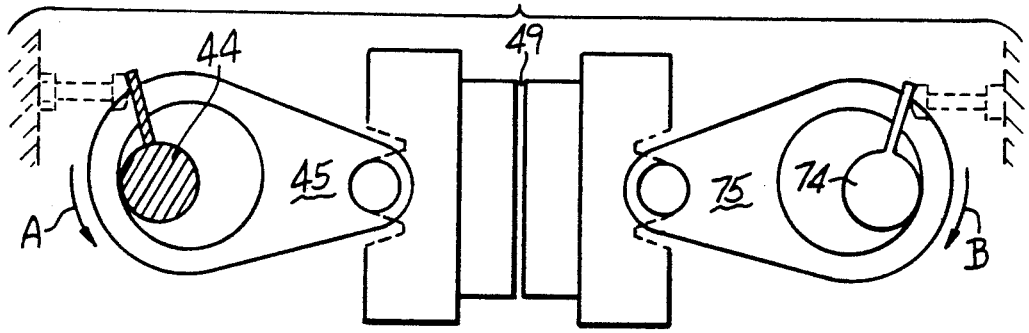

FIG. 7 shows the mold platens in their third position wherein the mold portions are slightly spaced apart to form a controlled vent 49 therebetween to the mold cavity preferably on the order of 0.005" to 0.010" wide.

This corresponds to the overstroked position. The crankshafts are held in this overstroked position by cams 46 and 76 contacting stops 47 and 77. Platens 41 and 42 have retracted slightly by a distance sufficient to form controlled vent 49. In this condition, the tiebars are relaxed somewhat. The mold faces may still be touching or slightly apart so that vent 49 to the mold cavity readily releases air trapped in the mold cavity without causing a witness line to be formed on the surface of the article.

In this overstroked position, the force tending to open this blow mold during blow molding tends to drive the platens and crankshafts against the stops and is thereby relieved from acting on the drive mechanism. Thus, the belt and motor are not stressed by the blowing action. Further, the stops are a mechanical means which results in good repeatability from one cycle to the next.

By reversing the drive means the clamp is opened to eject the part and prepare for the next cycle.

Thus, the apparatus of the present invention eliminates the cost of conventional mold vents which are normally machined in the molds parting surfaces. The conventional mold vents require constant repair in view of the constant clamping action of a conventional mold which hobs at parting surfaces and which eventually closes the vents requiring them to be re-machined at frequent intervals. By forming the controlled vent of the present invention and by holding the mold halves in a slightly spaced apart relationship in the molding position, all of the parting surface area is available as a vent. This greatly increases the available vent area and allows the vent width to be minimized for a given volume of air to be vented. Further, the present invention does not require the mold halves to be in contact and clamped tightly before blowing. Thus, there is no clamp force holding them together, typically up to 100 tons in conventional blow clamps. This means that the elasticity of the clamp links, tiebars, etc. can be considerably reduced since the toggle mechanism of the present invention does not need to deflect these components when overstroking the linkage. Consequently, when the blowing operation takes place, the mold is not likely to increase the vent width due to the internal force generated by the blowing action. This results in better control of the blowing process and the reduced possibility of witness lines being created on the surface of the final molded part. Further, in the overstroked position, the forces generated by blowing, trying to open the mold, are not transmitted through the linkage to the drive means. Thus, a smaller drive means can be used since it does not need to create a clamp force between the mold halves nor resist the blowing forces. The drive is simply required to move the platens between the positions described herein.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An apparatus for preparing a hollow plastic article which comprises: a blow mold for forming a hollow plastic article from a parison including at least two relatively reciprocable mold portions which form a mold cavity therebetween having a shape of a desired hollow plastic article; means for holding the parison within the blow mold; means for relatively moving said mold portions from an open position to a position wherein the mold portions are spaced apart to form a controlled vent therebetween; means for maintaining the mold portions in said controlled vent position; and means for introducing high pressure fluid into the parison to expand same into conformity with the mold cavity; whereby air trapped in the mold cavity is released via said controlled vent.

2. An apparatus for preparing a hollow plastic article which comprises: a blow mold for forming a hollow plastic article from a parison including at least two relatively reciprocable mold portions which form a mold cavity therebetween having a shape of a desired hollow plastic article; means for holding the parison within the blow mold; means for relatively moving said mold portions from a first open position to a second position wherein the mold portions are in contacting relationship to form a sealed said mold cavity therebetween to a third position wherein the mold portions are spaced apart to form a controlled vent therebetween; means for maintaining the mold portions in said third position; and means for introducing high pressure fluid into the parison to expand same into conformity with the mold cavity; whereby air trapped in the mold cavity is released via said controlled vent.

3. Apparatus according to claim 2 wherein both mold portions are movable.

4. Apparatus according to claim 2 wherein the mold portions are spaced apart to form a controlled vent to the mold cavity from 0.005" to 0.010" wide.

5. An apparatus for preparing a hollow plastic article which comprises: a blow mold for forming a hollow plastic article from a parison including at least two relatively reciprocable mold portions which form a mold cavity therebetween having a shape of a desired hollow plastic article; means for holding the parison within the blow mold; means for relatively moving said mold portions from a first open position to a second position wherein the mold portions are in contacting relationship to a third position wherein the mold portions are spaced apart to form a controlled vent therebetween; and means for introducing high pressure fluid into the parison to expand same into conformity with the mold cavity; whereby air trapped in the mold cavity is released via said controlled vent; wherein the means for relatively moving the mold portions comprises a toggle mechanism including a rotatable crankshaft and a linkage means connecting the crankshaft to at least one mold portion including means for rotatably mounting the crankshaft on the linkage means in an eccentric manner, whereby the crankshaft rotates from a first crankshaft position corresponding to said first position, to a second crankshaft position corresponding to said second position to a third crankshaft position corresponding to said third position wherein said third crankshaft position is an overstroked position.

6. Apparatus according to claim 5 including a first movable platen connected to one mold portion and a second movable platen connected to a second mold portion, wherein said means for relatively moving said mold portions relatively moves the platens in synchronism.

7. Apparatus according to claim 6 including a toggle mechanism for each platen, with each toggle mechanism including a rotatable crankshaft and linkage means connecting the crankshaft to its respective platen, and a timing belt interconnecting the crankshafts.

8. Apparatus according to claim 5 including a stop means to hold the crankshafts in the overstroked position.

* * * * *